United States Patent [19]

Barth et al.

[11] Patent Number: 5,533,581
[45] Date of Patent: Jul. 9, 1996

[54] ELECTRIC HAND TOOL, IN PARTICULAR DRILL

[75] Inventors: Walter Barth, Leinfelden-Echterdingen; Rudolf Fuchs, Neuhausen; Frank Langenfelder, Heilbronn, all of Germany; David M. Martinez, New Bern, N.C.

[73] Assignee: Robert Bosch GmbH, Stuttgart, Germany

[21] Appl. No.: 971,865
[22] PCT Filed: May 2, 1992
[86] PCT No.: PCT/DE92/00360
    § 371 Date: May 17, 1993
    § 102(e) Date: May 17, 1993
[87] PCT Pub. No.: WO92/20491
    PCT Pub. Date: Nov. 26, 1992

[30] Foreign Application Priority Data

May 18, 1991 [DE] Germany ............ 41 16 343.5

[51] Int. Cl.⁶ .................. B23Q 5/10; B25F 5/00
[52] U.S. Cl. ............... 173/216; 173/217; 173/42
[58] Field of Search ............... 173/216, 217, 173/213, 29, 45, 42

[56] References Cited

U.S. PATENT DOCUMENTS 1,978,369  10/1934  Levin ............... 173/42
2,348,266   9/1944  Selby .
2,414,637   1/1947  Crump ............... 173/213

FOREIGN PATENT DOCUMENTS 2253593  7/1975  France .
3634734  4/1988  Germany .
 362901  8/1962  Switzerland .

Primary Examiner—Scott A. Smith
Attorney, Agent, or Firm—Michael J. Striker

[57] ABSTRACT

In an electric hand tool, particularly a drill, with a housing, an electric motor which is received in the housing and has a motor shaft parallel to the housing axis, and with a work spindle which is driven by the electric motor via a transmission gearing, the housing is divided along a dividing plane for the purpose of switching from straight drilling to angular drilling and it is provided that the front housing part containing a bearing for the work spindle and the rear housing part containing the electric motor can swivel relative to one another in such a way that the work spindle projecting out of the front housing part can occupy any angle between 0° and 90° or more relative to the motor shaft. A catch lock which can be unlocked and/or locked manually stops the two housing parts in the selected swivel position. A torsionally rigid transmission of force from the motor shaft to the work spindle is realized in every swivel position of the housing parts in the transmission gearing.

7 Claims, 9 Drawing Sheets

ELECTRIC HAND TOOL, IN PARTICULAR DRILL

BACKGROUND OF THE INVENTION

The present invention relates to an electric hand tool, particularly a drill.

More particularly, it relates to an electric hand tool which has a housing, an electric motor accommodated in the housing and having a motor shaft, and a work spindle driven by the electric motor via a transmission gearing and carrying a tool receptacle.

Drills of this type are usually constructed as straight-drilling machines in which the drill spindle extends parallel to the motor shaft and axis of the housing and, for specific purposes, as angular-drilling machines in which the drill spindle is aligned at a right angle to the motor shaft and housing axis. In certain applications in which both straight and angular drilling must be carried out, as is the case in installations in American wooden house construction, the two machines must be at hand for continuous alternation.

A tool receptacle head serving as special accessory for a conventional drill is already known from DE 36 34 734 A1. It includes two separate housing parts having a hollow space which are located opposite one another and guided along a diagonally extending dividing plane. One housing part carries a support for a drive shaft and the other housing part carries a support for a power take-off shaft which projects out of the tool receptacle head and carries a drill chuck. The drive shaft and power take-off shaft are connected with one another by a double cardan or universal joint so as to be rigid with respect to torsion relative to one another. One hollow-cylindrical housing part of the tool receptacle head is placed on the spindle neck of the drill and the drill spindle of the drill is coupled with a driver by means of a double edge. The driver sits on the drive shaft so as to be fixed with respect to rotation relative to it. In the basic position of the two housing parts, the axes of the drive and power take-off shafts are flush with one another. Due to the relative rotation of the two housing parts, the power take-off shaft can be aligned in such a way that its axis encloses an acute or right angle with the axis of the drive shaft.

A standard drill can be re-tooled with this known tool receptacle head so as to form an angle drill which can also perform straight drilling.

While such a separate tool receptacle head serving as attachment is well-suited to the requirements of the home worker, it is not acceptable for professional machines.

SUMMARY OF THE INVENTION

Accordingly, it is an object of the present invention to provide an electric hand tool, particularly a drill of the above mentioned type, which avoids the disadvantages of the prior art.

In keeping with these objects and with others which will become apparent hereinafter, one feature of the present invention resides, briefly stated, in an electric hand tool of the above type in which in accordance with the present invention the housing is divided along a dividing plane so that the front housing part which contains a bearing for the work spindle and a rear housing part which contains the electric motor can rotate relative to one another in such a way that the work spindle projecting in the front housing part can occupy any angle between 0° and 90° or more relative to the motor shaft and the housing axis, a catch lock can be unlocked and locked manually for stopping the housing parts in a selected swivel position, and a torsionally rigid transmission of force from the motor shaft to the electric motor to the work spindle is realized in the transmission gearing in every swivel position of the housing parts.

When the electric hand tool is designed in accordance with the present invention, it; has the advantage of being a compact, convenient electric tool for professional requirements which at first glance does not differ from a standard electric tool, but in contrast to the latter allows an angular position of the work spindle relative to the motor shaft and housing axis between 0° and 90° (flush and at a right angle). This electric tool can be used for both straight and angular drilling and also enables diagonal bore holes.

The work spindle can be manually switched quickly and easily by a catch lock so that it is possible to work with different angular positions of the work spindle in repetitive sequence. A rigid torsion-proof transmission of force is provided in every position of the work spindle so that transmission faults do not occur. The higher cost of the transmission gearing in comparison with a standard electric tool is offset in part by taking advantage of the gearing space for larger gear wheel diameters and a complete gearing step can be dispensed with as a result of the greater transmission ratio made possible by this.

In a preferred embodiment form of the invention the transmission gearing is constructed as a double bevel gear unit whose first bevel gear sits on an intermediate shaft so as to be fixed with respect to rotation relative to it, the intermediate shaft being supported in the housing, and meshes with a first bevel pinion which is supported on the motor shaft so as to be fixed with respect to rotation relative to it and whose second bevel gear sits on the work spindle so as to be fixed with respect to rotation relative to it and meshes with a second bevel pinion which is rigidly attached to the intermediate shaft. A rotating rim whose rotational axis encloses an angle of 90° or 45° relative to the axis of the motor shaft is arranged in the dividing plane between the two housing parts. The advantage of the latter version consists in that the corner dimension, i.e. the distance of the work spindle from the foremost housing edge, is substantially smaller in the angular drilling position.

In a first embodiment form of the invention the transmission gearing is constructed as a spur gear unit whose power take-off shaft is connected via a double-jointed drive or universal shaft with the work spindle so as to be fixed with respect to rotation relative to it. The work spindle and the power take-off shaft of the spur gear unit are arranged so as to be offset relative to one another in such a way that the axis of the universal shaft coincides with the rotational axis of the rotating rim and encloses an axial angle of 45° with the axes of the motor shaft and work spindle in the basic position and in the 90-degree swivel position of the two housing parts. The axis of rotation of the rotating rim situated in the dividing plane between the two housing parts encloses an angle of 45° with the axis of the motor shaft and the joint of the universal shaft on the work spindle side is situated approximately in the dividing plane. This construction has the particular advantage that extremely small corner dimensions can be realized for the 0-degree and 90-degree positions of the work spindle. However, a disadvantage to be taken into account consists in that speed errors occur in the intermediate positions of the work spindle since there is no compensation of the transmission errors of the universal joints.

In a construction of the embodiment form of the invention an intermediate flange is arranged in the region of the dividing plane between the two housing parts, which intermediate flange is rotatably supported at the front housing part and is connected with the rear housing part so as to be fixed with respect to rotation relative to it. The dividing plane is situated in such a way that the axis of rotation of the intermediate flange encloses a right angle with the motor shaft. The intermediate flange is preferably clamped in between two axial bearings arranged one behind the other in the axial direction. One axial bearing is supported at the front housing part and the other axial bearing is supported at a clamping plate which is screwed to the front housing part. The intermediate flange which is rotatable relative to the front housing part is sealed relative to the latter by an O-ring. The constructional unit which includes the intermediate flange, axial bearings and clamping plate and is securely connected with the front housing part is inserted into the rear housing part and the intermediate flange is fastened to it by screws. In this way the intermediate flange is rotatably mounted at the front housing part so as to be virtually free of play and the gap between the two mutually rotatable housing parts is accordingly very small. Accordingly, a seal is achieved which on the whole has low friction and is tight against dust. The drill can be assembled very simply and quickly as a result of the constructional unit preassembled on the front housing part.

DESCRIPTION OF THE PREFERRED EMBODIMENT

Figure 1:
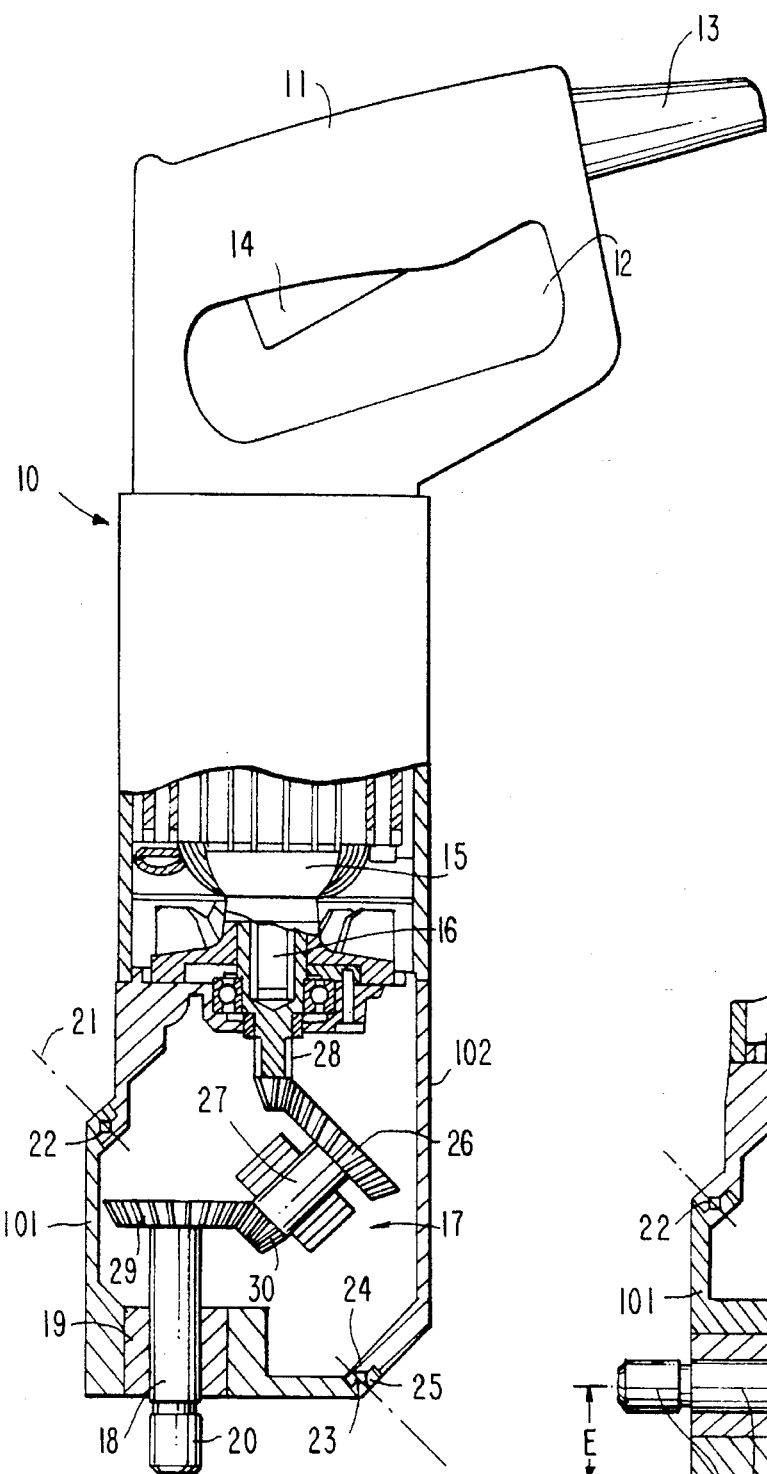
FIG. 1 shows a side view of an electric hand drill, partially in section.

The electric hand drill shown in partial section in FIG. 1 as an example for an electric hand tool has a housing 10 on which a handle 11 with a grip opening 12 is formed in one piece. The connection cable is designated by 13 and the switch strip for switching the drill on and off is designated by 14.

An electric motor 15 whose motor shaft 16 extends along the housing axis is received in a known manner in the housing 10. The motor shaft 16 drives a drill spindle 18 via a transmission gearing 17. The drill spindle 18 is rotatably supported in a bearing 19 of the housing 10 and projects out of the housing 10. The drill spindle 18 carries a drill chuck 20 at its free end projecting out of the housing 10 for clamping a drill bit.

The housing 10 is divided along a dividing plane, designated by 21, into a front housing part 101 containing the bearing 19 for the drill spindle 18 and into a rear housing part 102 which receives the motor 15 with motor shaft 16. The dividing plane is situated at an angle of 45° relative to the axis of the motor shaft 16 and the housing axis, respectively. A rotating rim 22 whose axis of rotation is vertical relative to the dividing plane 21 is arranged in the dividing plane 21 between the two housing parts 101 and 102. The rotating rim 22 has two annular grooves 23, 24 which are inserted into the front and rear housing part 101, 102, respectively. The front housing part 101 overlaps the rear housing part 102 in the region of the dividing plane 21 in such a way that the two annular grooves 23, 24 which are triangular in cross section are situated one on above the other in a mirror-inverted manner in the dividing plane 21 and form an annular duct which is filled with balls 25. For the purpose of filling the annular duct 23, 24 with the balls 25 a filling bore hole (not shown) is inserted in the front housing part 101 from the outside. The filling bore hole opens into the annular groove 23 and has a bore hole diameter which is greater than the ball diameter. The balls 25 are inserted into the annular duct formed from the annular grooves 23, 24 through this filling bore hole. The filling bore hole is then closed.

The transmission gearing 17 between the motor shaft 16 and the drill spindle 18 which extends parallel to the motor shaft 16, but so as to be offset relative to it, in the basic position shown in FIG. 1 is constructed as a double bevel gear unit. The first bevel gear 26 sits on an intermediate shaft 27 so as to be fixed with respect to rotation relative to it, the intermediate shaft 27 being supported in the housing 10, and meshes with a first bevel pinion 28 which sits on the motor shaft 16 so as to be fixed with respect to rotation relative to it. The second bevel gear 29 of the second gearing step sits on the drill spindle 18 so as to be fixed with respect to rotation relative to it and meshes with a second bevel pinion 30 which is constructed on the intermediate shaft 27. The axis of the intermediate shaft 27 coincides with the axis of rotation of the rotating rim 22.

Figure 2:
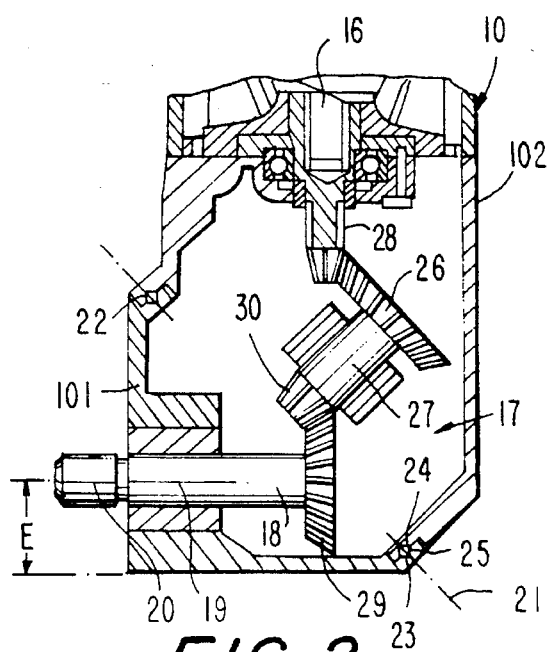
FIG. 2 shows a section through part of the drill in FIG. 1 with drill spindle swiveled for angular drilling.

When the front housing part 101 is turned relative to the rear housing part 102, the second bevel gear 29 wanders around the axis of rotation of the rotating cross 22 while remaining always engaged with the second bevel pinion 30 so that force is transmitted from the motor shaft 16 to the drill spindle 18 in a torsionally rigid manner in every swivel position of the front housing part 101 via the transmission gearing 17. FIG. 2 shows the 90-degree swivel position of the front housing part 101. The drill spindle 18 is at a right angle to the motor shaft 16 and can carry out angular drilling with the drill. The minimum corner dimension E, i.e. the distance of the axis of the drill spindle 18 from the foremost housing edge, is determined in this construction of the bevel gear unit 17 with axial angles of 45° by the diameter of the second bevel gear 29 and can accordingly be kept very small in an advantageous manner. The two housing parts 101, 102 are locked together so as to be fixed with respect to rotation relative to one another in every angular position between 0° and 90° by a catch lock to be described in the following, so that the drill forms an easily handled rigid unit.

Figure 3:
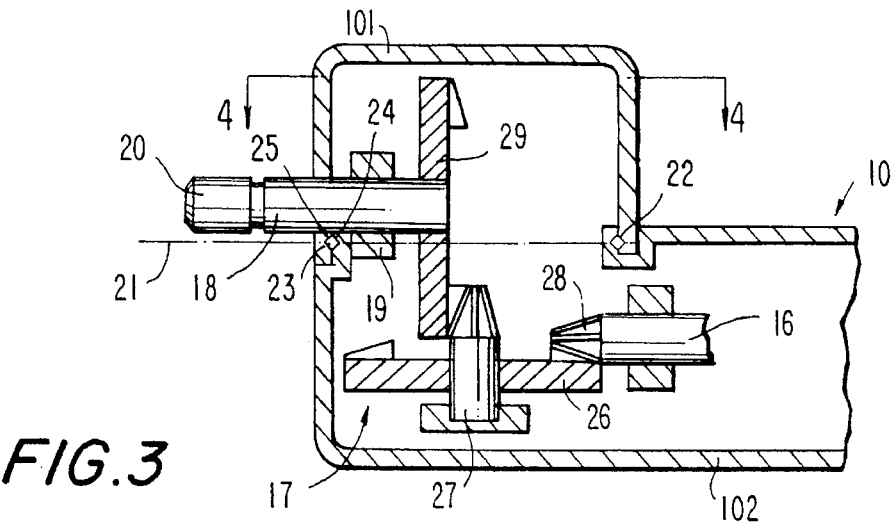
FIG. 3 is a schematic view of a longitudinal section through part of a drill according to another embodiment example.
Figure 4:
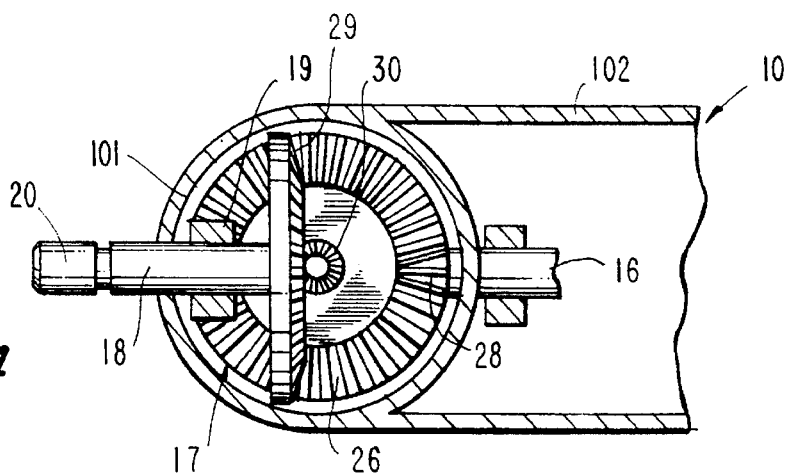
FIG. 4 shows a section according to line IV—IV in FIG. 3.
Figure 5:
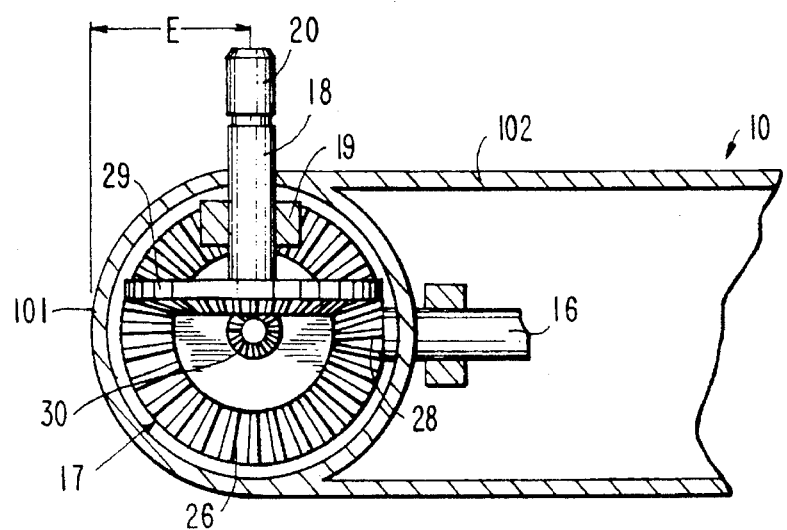
FIG. 5 shows the same view as in FIG. 5 with the drill spindle rotated by 90° for angular drilling.

The drill, sections of which are shown in FIGS. 3 to 5, likewise has a transmission gearing 17 constructed as a bevel gear unit. As shown by the longitudinal section in FIG. 3, the dividing plane 21 between the front housing part 101 and the rear housing part 102 is situated parallel to the axis of the motor shaft 16 and the housing axis so that the rotational axis of the rotating rim 22 arranged in the dividing plane is at a right angle to the axis of the motor shaft 16. The bevel gear unit 17 is constructed with axial angles of 90° corresponding to this position of the dividing plane 21. The axis of the intermediate shaft 27 is in turn flush with the rotational axis of the rotating rim 22. FIG. 4 shows a sectional view of the drill according to section IV—IV in FIG. 3. The front housing part 101 is in its 0° basic position and the drill can be used for straight drilling. By turning the front housing part 101 in the rotating rim 22, the drill spindle 18 can be adjusted to every desired angle between 0° and 90° relative to the motor shaft 16. The 90-degree rotating position is shown in FIG. 5. As can clearly be seen, the minimum corner dimension E is determined by the first bevel gear 26 and is accordingly greater than in the drill shown in FIGS. 1 and 2.

Figure 12:
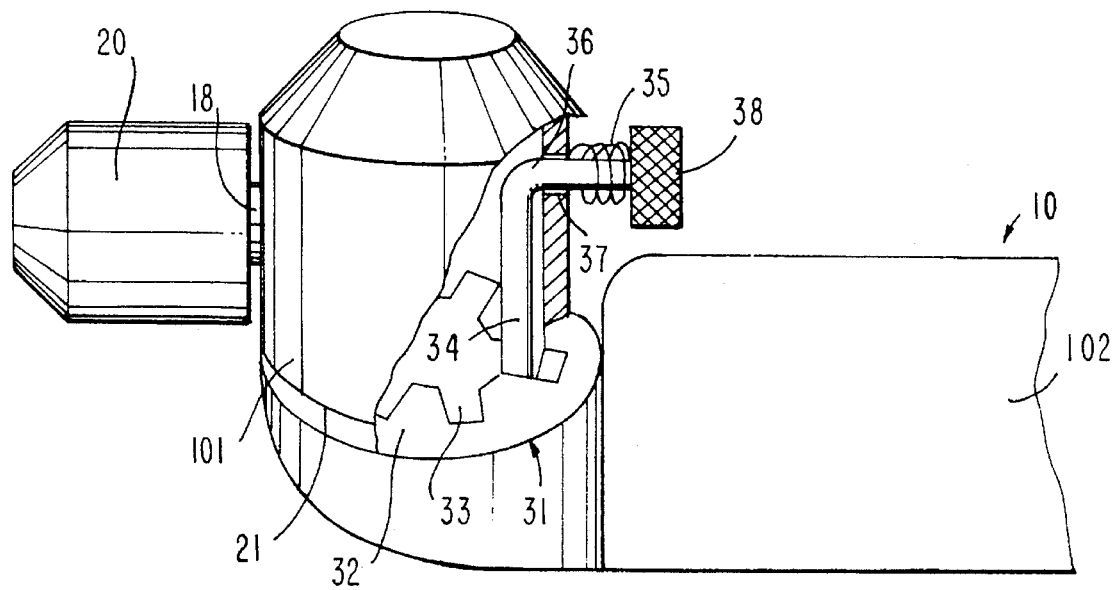
FIGS. 12 and 13 show a perspective view of part of a drill with a catch lock for the rotating housing part.

As in the drill shown in FIGS. 1 and 2, the front housing part 101 can be stopped in any swivel position between 0° and 90° by a catch lock at the rear housing part 102. An example for such a catch lock 31 is shown schematically in the angular drill according to FIG. 12 or in the angular drill according to FIG. 13. In both cases the catch lock 31, which includes a rim 32 with a plurality of grooves 33 arranged at equidistant intervals and a locking pin 34, catches in one of the grooves 33 under the influence of the spring tension of a pressure spring 35. In the embodiment example in FIG. 12, the rim 32 with grooves 33 is fastened parallel to the dividing plane 21 in the rear housing part 102. The locking pin 34 is formed by a leg of a locking angle 36 extending vertically relative to the dividing plane 21, the other leg extending radially and projecting outward through a bore hole 37 in the front housing part 101. The second leg of the locking angle 36 carries a knob 38 at the end. The pressure spring 35, which is constructed as a helical spring and concentrically surrounds this leg, is supported at the knob 38 and at the housing wall of the front housing part 101 and accordingly presses the locking pin 34 into one of the grooves 33 of the rim 32. To adjust a different swivel position of the drill spindle 18 with the drill chuck 20 the locking angle 36 is radially displaced in the bore hole 37 by applying force to the knob 38 so that the locking pin 34 leaves the groove 33. After the new angular position of the drill spindle 18 is adjusted by turning the front housing part 101, the knob 38 is released again and the pressure spring 35 pushes the locking pin 34 back into the corresponding groove 33.

Figure 13:
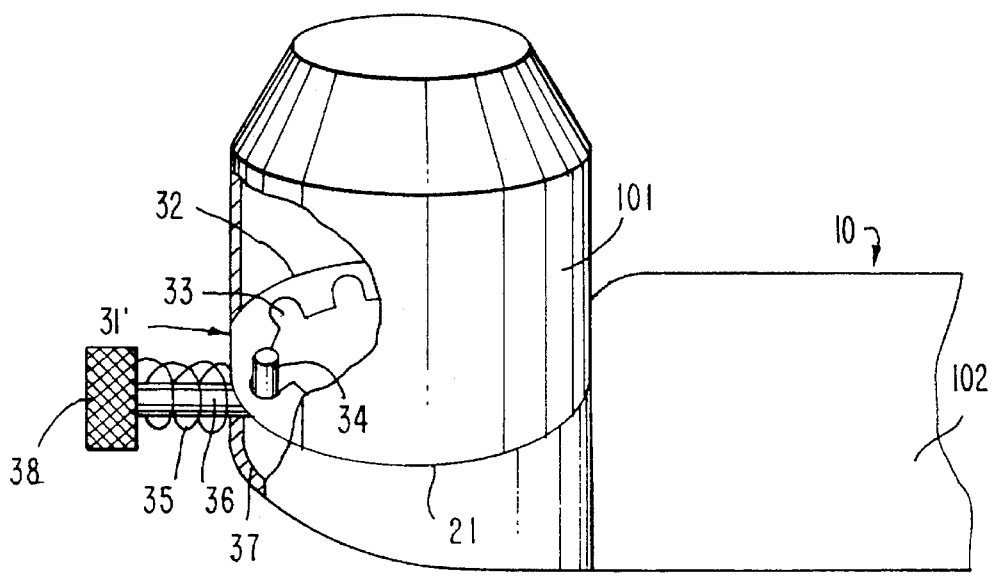

The catch lock 31 in the drill according to FIG. 13 is modified only in that the rim 32 with grooves 33 is fastened in the front housing part 101 parallel to the dividing plane 21 and the locking angle 36 with locking pin 34 is guided so as to be axially displaceable in a bore hole 37 in the rear housing part 102. For the rest, the construction and operation are identical.

Figure 6:
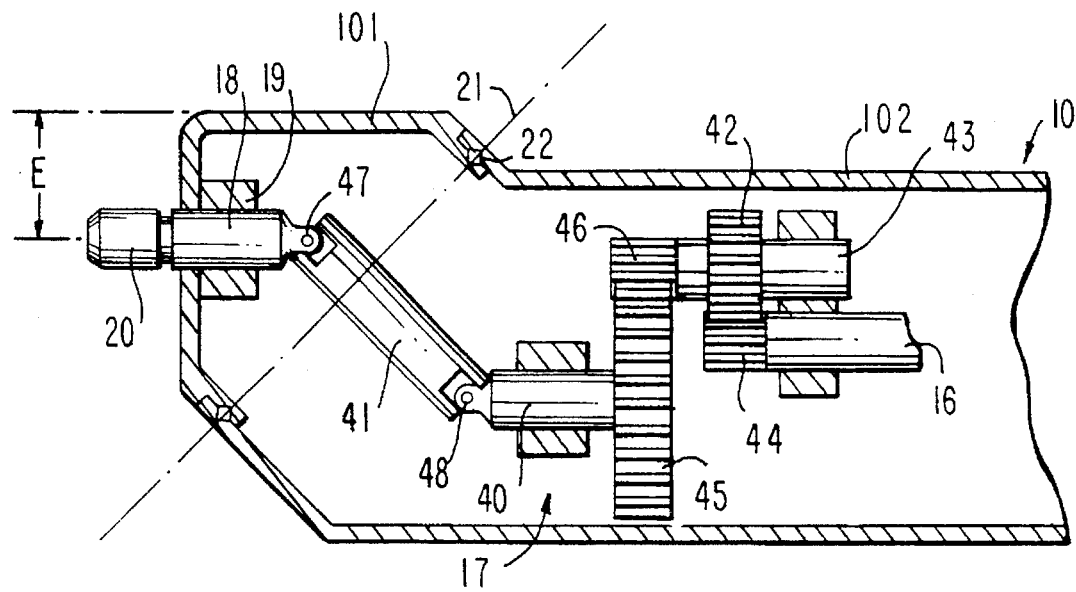
FIGS. 6 and 7 show schematic longitudinal sections through part of a drill according to a third embodiment example in the "straight drilling" position (FIG. 6) and "angular drilling" position (FIG. 7)
Figure 7:
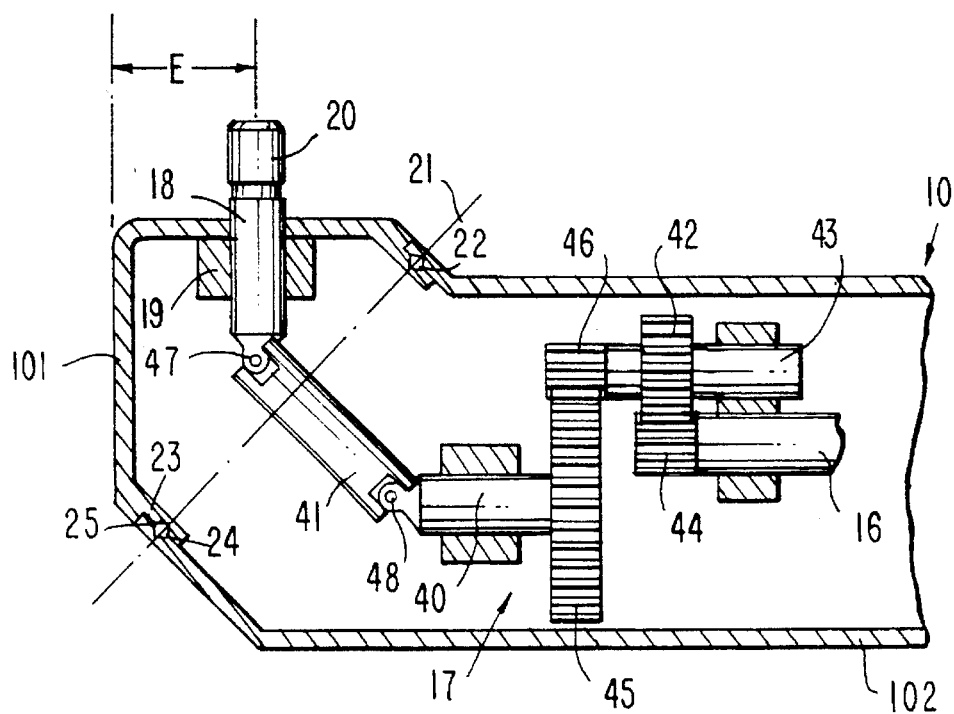

In the drill according to FIGS. 6 and 7, the dividing plane 21 is situated between the front housing part 101 and the rear housing part 102 at an angle of 45° relative to the axis of the motor shaft 16 and housing axis, respectively. The transmission gear unit 17 is constructed as a double spur gear unit whose power take-off shaft 40 is connected with the drill spindle 18 via a double-jointed universal shaft 41 so as to be rigid against torsion. The double spur gear unit 17 has a first spur gear 42 which sits on an intermediate shaft 43 supported in the housing 10 so as to be fixed with respect to rotation relative to it and meshes with a first drive pinion 44 sitting on the motor shaft 16 so as to be fixed with respect to rotation relative to it and a second spur gear 45 which is connected with the intermediate shaft 43 so as to be fixed with respect to rotation relative to it and meshes with a second drive pinion 46 which is constructed at the intermediate shaft 43. The torsionally rigid connection between the universal shaft 41 and the power take-off shaft 40 is produced by a first universal joint 48 and the torsionally rigid connection between the universal shaft 41 and the drill spindle 18 is produced by a second universal joint 47. The drill spindle 18 and the power take-off shaft 40 of the spur gear unit 17 are arranged so as to be offset relative to one another in such a way that the axis of the universal shaft 41 coincides with the rotational axis of the rotating rim 22 in the dividing plane 21 and encloses an axial angle of 45° with the axes of the motor shaft 16 and drill spindle 18 in the 0-degree basic position (FIG. 6) and in the 90-degree swivel position (FIG. 7) of the two housing parts 101, 102. The universal joint 47 of the universal shaft 41 on the work spindle side is situated in or in the vicinity of the dividing plane 21. As can be seen from FIGS. 6 and 7, the universal shaft 41 is accordingly guided in a Z-shaped manner in straight drilling operation and angularly in angular drilling operation and the transmission errors of the universal joints 47, 48 are compensated for in these two positions by the axial angle of 45°. This construction has the particular advantage that extremely small corner dimensions E can be realized for both positions shown in FIGS. 6 and 7. However, the fact must be taken into account that transmission errors of the universal joints 47, 48 are not compensated for in the intermediate positions of the drill spindle 18 between the 0-degree and 90-degree swivel positions and speed errors occur. This drill is therefore constructed exclusively with only these two swivel positions of the drill spindle 18, namely 0° and 90°.

Figure 8:
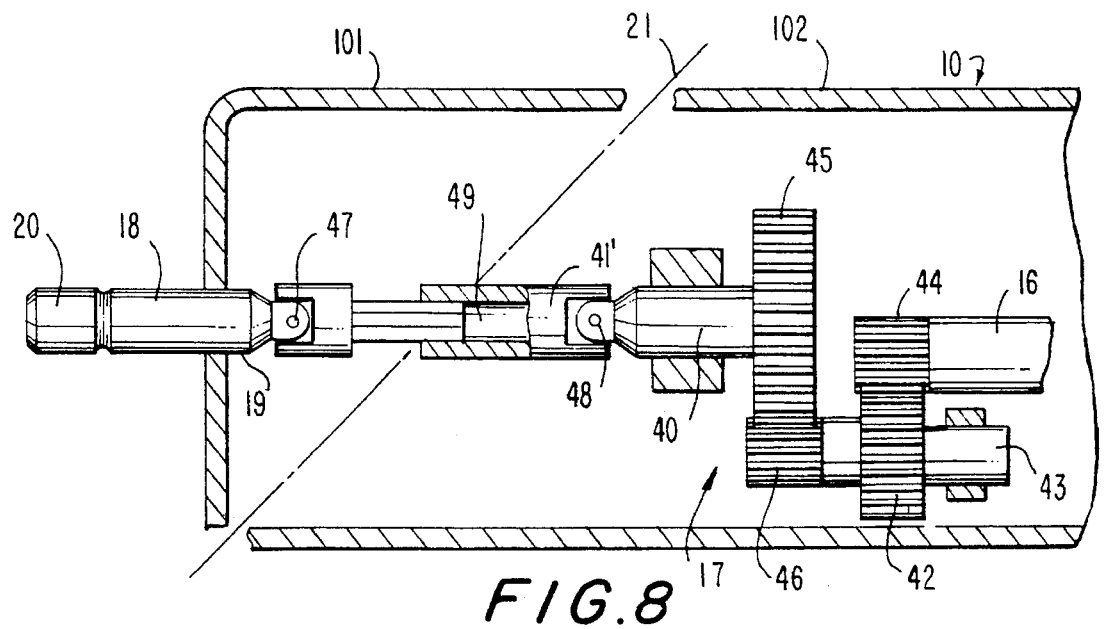
FIGS. 8 and 9 are schematic longitudinal sections through part of a drill according to a fourth embodiment example in the "straight drilling" position (FIG. 8) and "angular drilling" position (FIG. 9)
Figure 9:
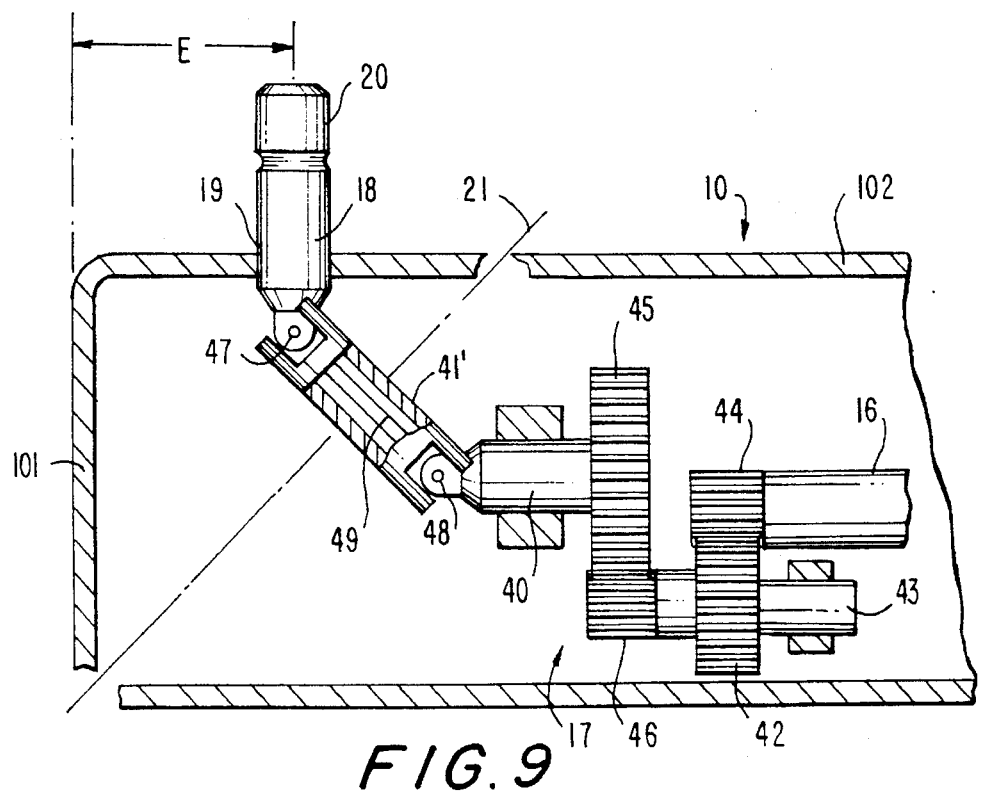

The drill which is shown schematically in part in FIGS. 8 and 9 in longitudinal section is largely identical with the drill according to FIGS. 6 and 7 with the exception that the universal shaft 41 is not guided in a Z-shaped manner in the 0-degree basic position of the front housing part 101, i.e. in the "straight drilling" position, but rather is stretched and is flush with the drill spindle 18 and the power take-off shaft 40 of the transmission gearing 17 which is likewise constructed as a double spur gear unit. The dividing plane 21 is situated approximately in the center of the universal shaft 41. The universal shaft 41 is also outfitted with length compensating means 49 which makes it possible to lengthen or shorten the universal shaft 41 when rotating the front housing part 101. In contrast to the drill according to FIGS. 6 and 7, the corner dimension E cannot be made optionally small in straight drilling operation, since it is defined by the first spur gear 42 of the double spur gear unit 17 and the arrangement of the second spur gear 45 is predetermined by the central position of the drill spindle 18.

Figure 10:
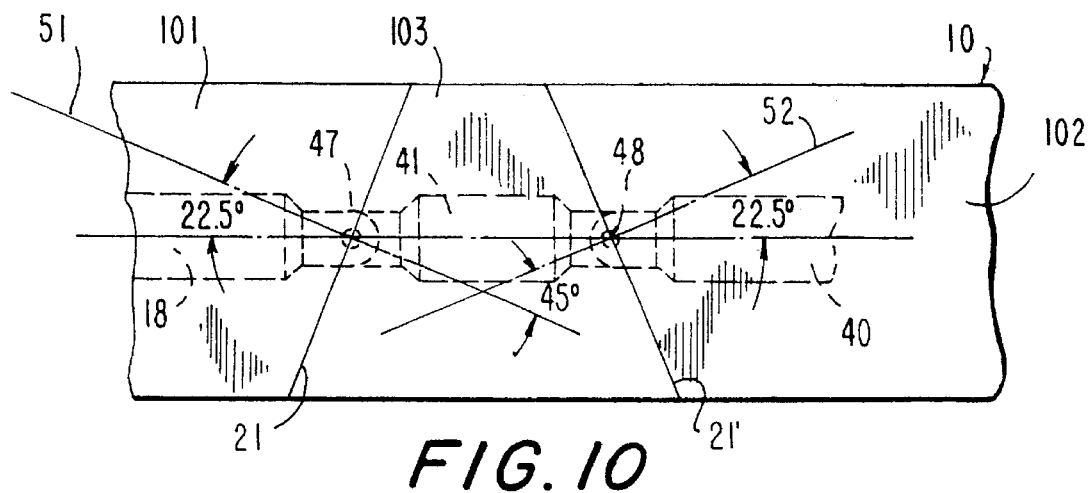
FIGS. 10 and 11 are schematic side views of a part of a drill according to a fifth embodiment example in the "straight drilling" position (FIG. 10) and "angular drilling" position (FIG. 11)
Figure 11:
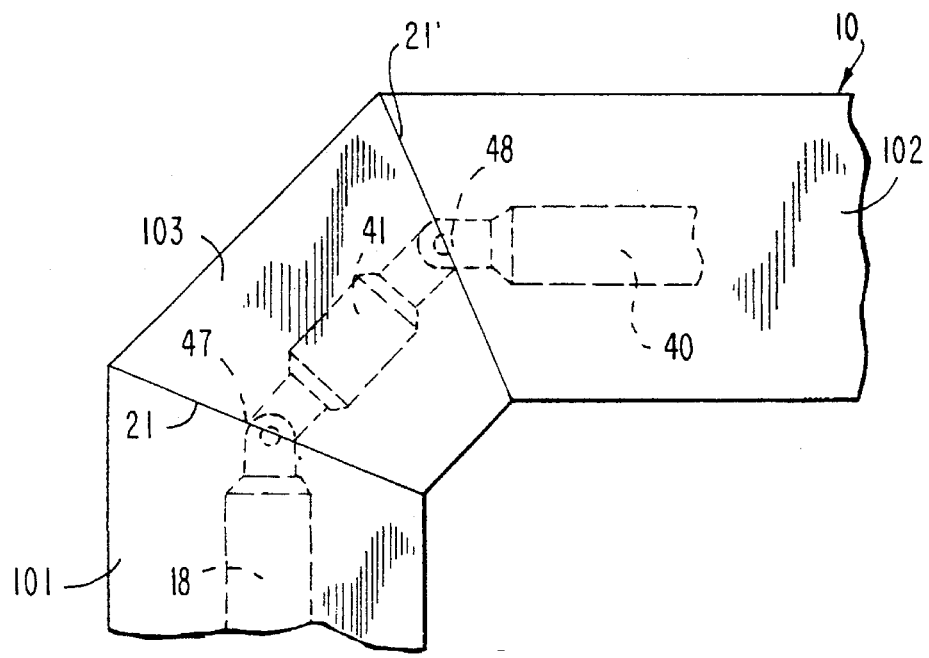

In the drill shown in part in FIGS. 10 and 11 in a side view, the housing 10 is divided along another dividing plane 21' and the intermediate housing 103 which is accordingly formed is connected with the front housing part 101 and with the rear housing part 102 via a rotating rim (not shown) which is arranged in the dividing plane 21 or 21'. The dividing planes 21, 21' and the two rotating rims situated therein are arranged in such a way that the axes of the rotating rims enclose an angle of 22.5° with the housing axes of the front housing part 101 and rear housing part 102 and intersect at an angle of 45°. The rotational axes of the two rotating rims are designated by 51 and 52 in FIG. 10. The front housing part 101 and the rear housing part 102 are connected with one another so as to be fixed with respect to rotation via a guide, not shown, so that they cannot rotate relative to one another. The transmission gearing of the drill, not shown here, is again constructed as a double spur gear unit whose power take-off shaft is designated by 40. The power take-off shaft 40 and drill spindle 18 are again connected with the two universal joints 47, 48 so as to be rigid with respect to torsion via a universal shaft 41. The articulation points of the universal joints 47, 48 lie in dividing planes 21, 21', respectively. If this is dispensed with, the universal shaft 41 must be provided with length compensating means.

The intermediate housing 103 is rotated in order to swivel the drill spindle 18. The drill spindle 18 can be swiveled into any desired swivel position relative to the housing axis of the rear housing part 102 and can be locked in the swivel position. FIG. 11 shows the 90-degree position of the drill spindle 18 for angular drilling. In this drill, as in the drill according to FIGS. 8 and 9, the corner dimension E in straight drilling is defined by the first spur gear. The arrangement of the second spur gear of the second gear unit stage is predetermined by the position of the drill spindle 18 and can have only a limited diameter if a small corner dimension is desired. An additional gearing step may be required under certain conditions to achieve a sufficient total transmission ratio.

Figure 14:
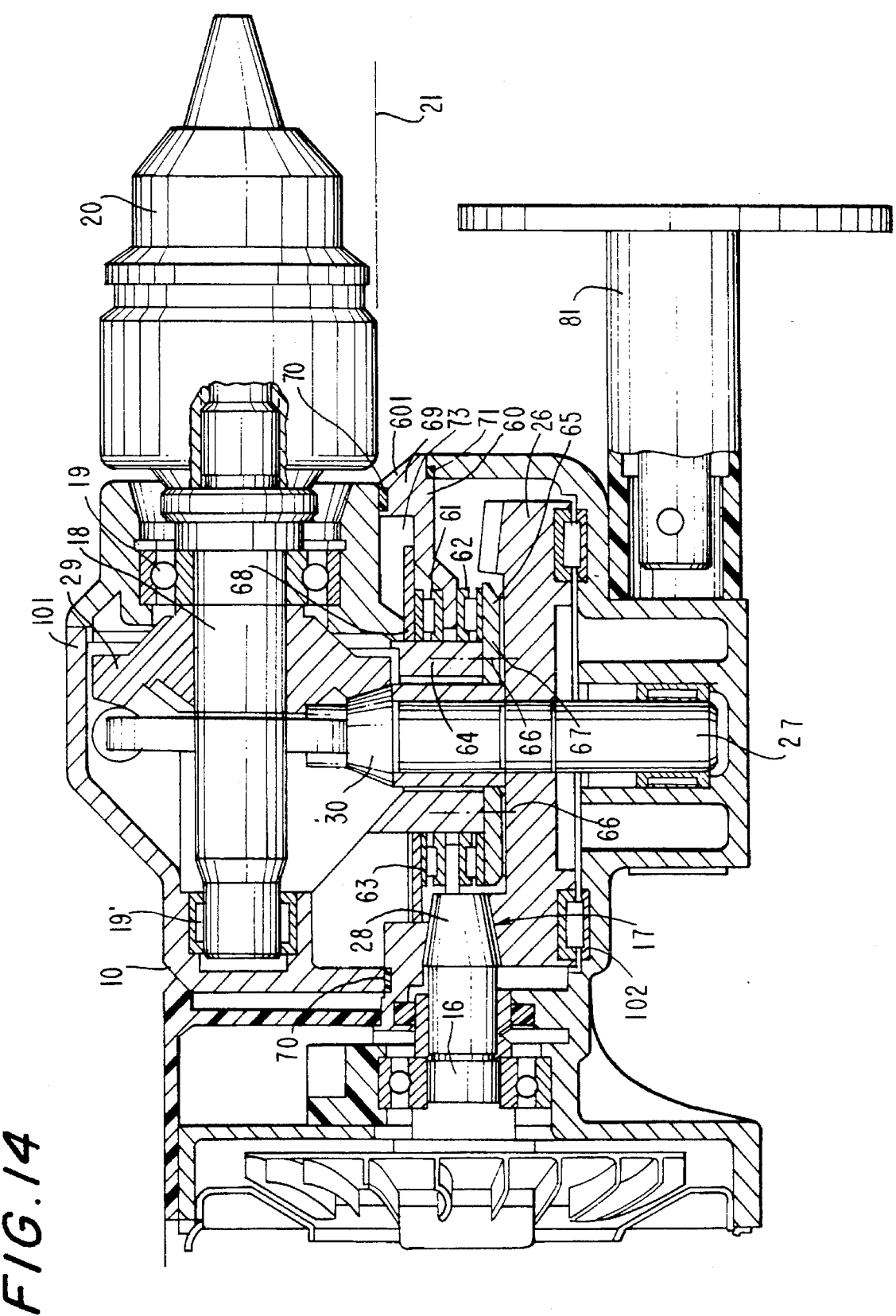
FIG. 14 shows a longitudinal section through part of a drill according to a sixth embodiment example.
Figure 15:
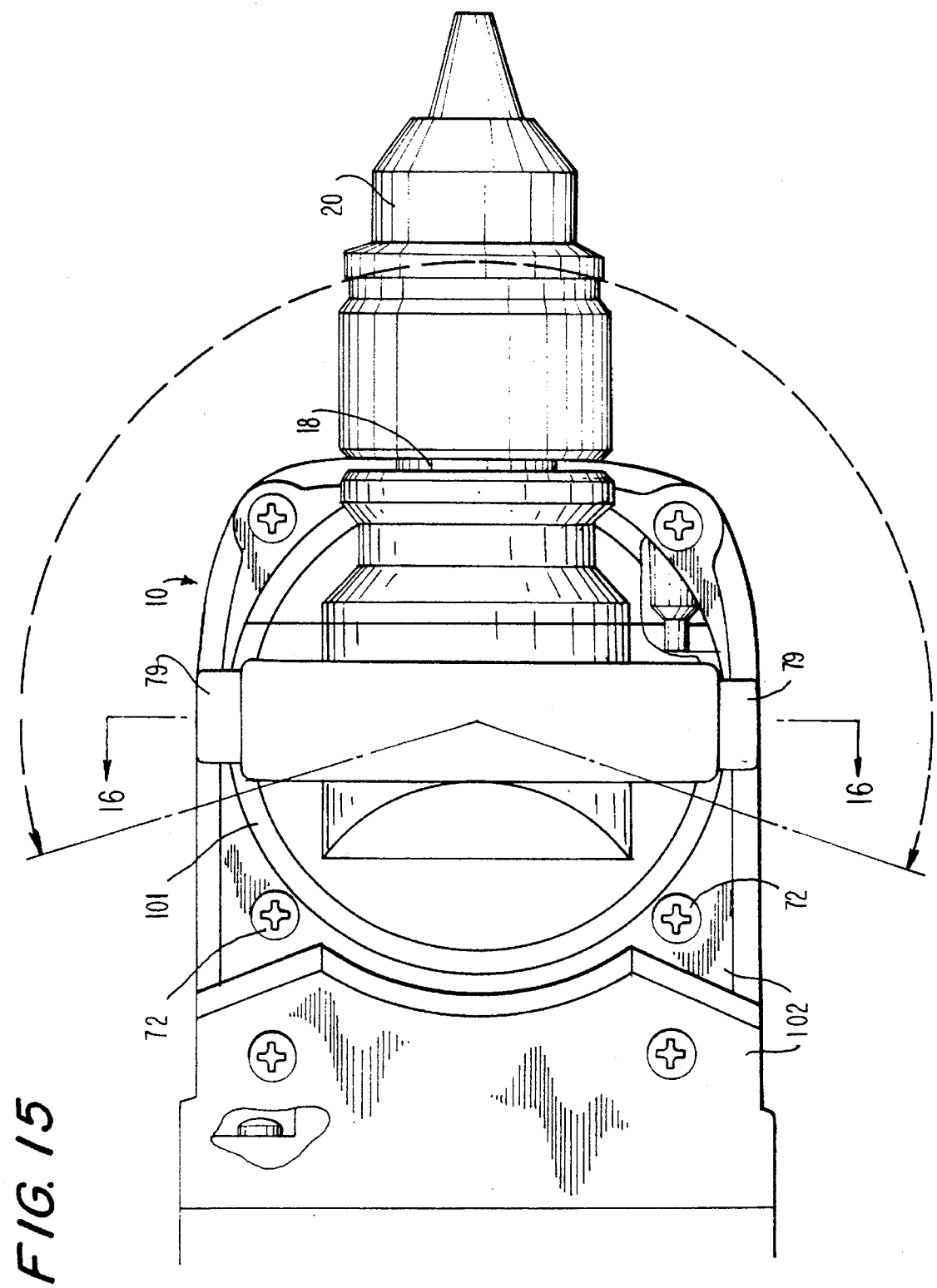
FIG. 15 shows a top view of the drill as seen in the direction of arrow XV in FIG. 14.
Figure 16:
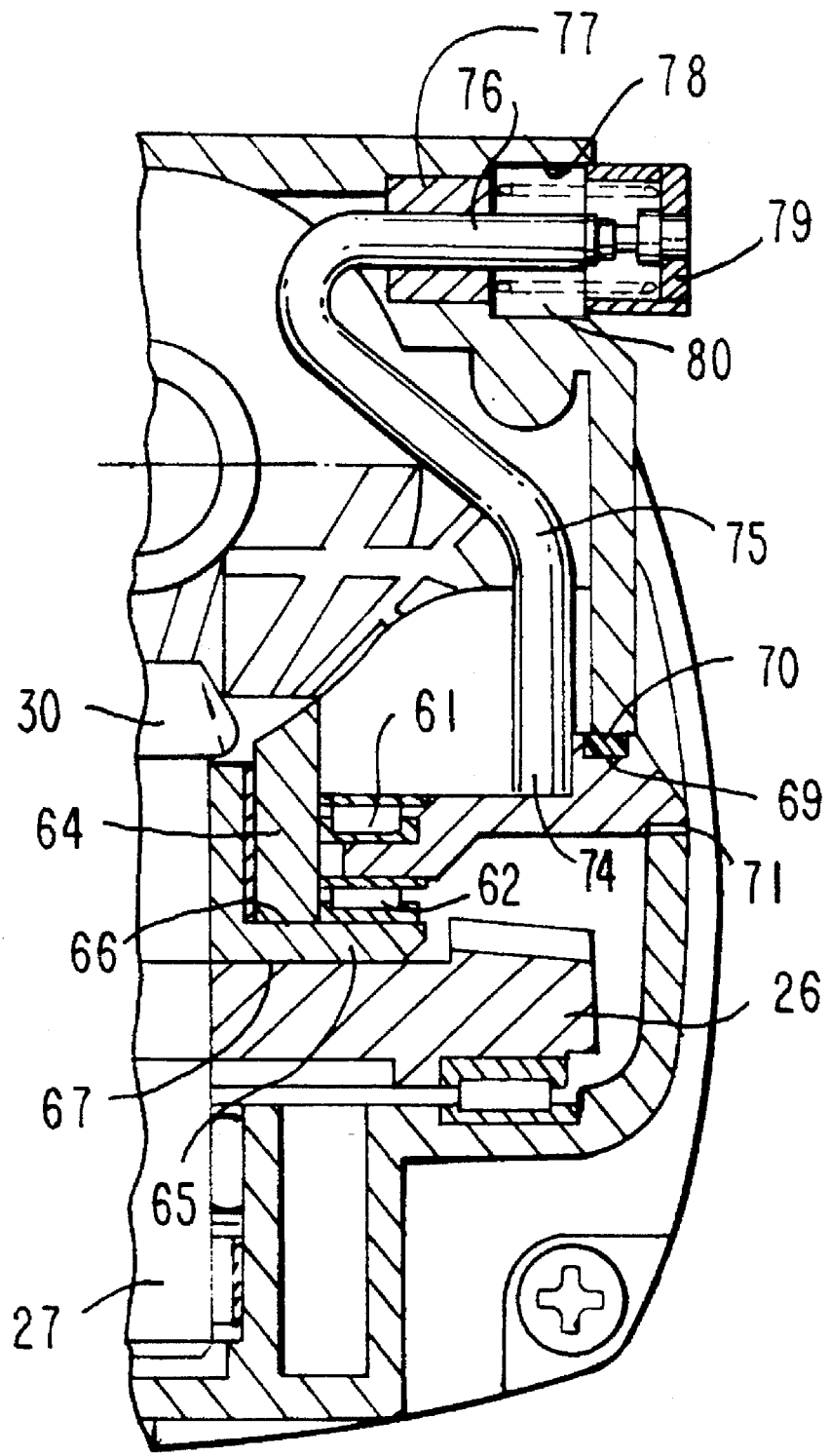
FIG. 16 shows a section along line XVI—XVI in FIG. 15.

The construction of a drill shown in part in FIGS. 14 to 16 conforms to that of the angle drill in FIGS. 3 to 5 with respect to the position of the dividing plane 21 between the front and rear housing parts 101, 102 and the construction of the transmission gearing 17 as a double bevel gear unit with axial angles of 90°. However, in this instance the rotating rim is replaced by an intermediate flange 60 which is rotatably mounted at the front housing part 101 in the region of the dividing plane 21 and is connected with the rear housing part 102 so as to be fixed with respect to rotation relative to it. The rotational axis of the intermediate flange 60 occupies an angle of 90° relative to the axis of the motor shaft 16. In order to mount the intermediate flange 60 at the front housing part 101 in a rotatable manner, the intermediate flange 60 is clamped between two axial bearings 61, 62 which are placed together with the intermediate flange 60 and a supporting plate 63 on a hollow receiving sleeve 64 which is connected with the front housing part 101. A clamping plate 65 is securely screwed to the front side of the receiving sleeve 64 by threaded screws, designated by 66, and has a central bore hole 67 exposing the clear opening of the receiving sleeve 64. The axial length of the receiving sleeve 64 is dimensioned in such a way that the supporting plate 63 contacts a stop shoulder 68 constructed on the front housing part 101 at the base of the receiving sleeve 64 and the axial bearing 61 is supported between this supporting plate 63 and the intermediate flange 60, and the axial bearing 62 is supported between the intermediate flange 60 and the clamping plate 65. The intermediate flange 60 has a somewhat cap-shaped construction and carries a groove 69 in the end face of its thickened edge area 601 facing the front housing part 101, which groove 69 receives a sealing ring 70 contacting the front housing part 101. The sealing ring 70 is arranged in such a way that it does not obstruct or hinder the relative rotation between the front housing part 101 and the intermediate flange 60 so that the intermediate flange 60 can be turned easily by hand relative to the front housing part 101. The play occurring in the dividing plane 21 during relative rotation between the front housing part 101 and the intermediate flange 60 is extremely small due to the clamping of the intermediate flange 60 between the two axial bearings 61, 62, and the gap between the front housing part 101 and intermediate flange 60 is sealed so as to be reliably tight against dust via the sealing ring 70 in every rotating position of the front housing part 101.

The front housing part 101 with the constructional unit attached to it and including the intermediate flange 60, axial bearings 61, 62 and clamping plate 65 is placed on the pot-shaped rear housing part 101 in this region in an exact fit. The rear housing part 102 engages in a circumferential fitting groove at 71 with an annular projection. The receiving sleeve 64 overlaps the front part of the intermediate shaft 27 of the transmission gearing 17 supported in the rear housing part 102 with play approximately up to the first bevel gear 26 which sits on the intermediate shaft 27 so as to be fixed with respect to rotation relative to it and meshes with the first bevel pinion 28 which is connected with the motor shaft 16 so as to be fixed with respect to rotation relative to it. At the conclusion of the attaching movement of the front housing part 101 with the intermediate flange 60, the second bevel pinion 30 constructed at the free end of the intermediate shaft 27 engages with the second bevel gear 29 sitting on the drill spindle 18 so as to be fixed with respect to rotation relative to it. The drill spindle 18 with the drill chuck 20 fastened to it is received in the front housing part 101 so as to be rotatable via a ball bearing 19 and a roller bearing 19'. After the front housing part 101 is placed on the rear housing part 102 the intermediate flange 60 is fixed at the rear housing part 102 by screws 72 (FIG. 15). The front housing part 101 is accordingly fastened to the rear housing part 102 in the dividing plane 21 so as to be rotatable. As indicated in FIG. 15, the swiveling area of the front housing part 101 with the drill spindle 18 is 225°. The drill spindle 18 can thus be swiveled toward both sides up to an angle of 112.5° relative to the axis of the motor shaft 16.

In the swiveling area of 225° of the upper housing part 101, a catch is provided in angular steps of 22.5° in which the upper housing part 101 can be rigidly fastened at the lower housing part 102. A catch lock 31", shown in FIGS. 15 and 16, is provided for this purpose. As in the embodiment example according to FIG. 12, the catch lock 31" includes a ring of equidistant catch recesses 73 arranged in angular increments of 22.5°, which in this instance is held at the intermediate flange 60 so as to be fixed against rotation, and two locking pins which are held in the front housing part 101 so as to be radially displaceable. One locking pin 74 is shown in FIG. 16. The catch recesses 73 are formed directly at the intermediate flange 60. A catch recess 73 is also shown in FIG. 14. Every catch recess 73 is open in the radial direction so that the locking pins 74 can be slid out of the catch recesses 73 by radial displacement or can engage in them under the influence of spring pressure. As can be seen in FIG. 16 for one locking pin 74, the two locking pins 74 are arranged so as to be radially displaceable diametrically opposite one another at the front housing part 101. Each locking pin 74 is formed by the free end of a stirrup 75 (FIG. 16) which is inserted into a guide 77 in the front housing part 101 so as to slide with a sliding bar 76 bent at an angle of 90° relative to the locking pin 74, the guide 77 being aligned transversely relative to the drill spindle 18. A pocket-like receiving bore hole 78 of increased diameter for an unlocking knob 79 adjoins the guide 77 on the outside. The unlocking knob 79 is fastened at the free end of the sliding bar 76 and projects out of the housing contour in the locking position of the locking pin 74. A cylindrical pressure spring 80 placed on the sliding rod 76 is supported at the base of the receiving bore hole 78 on the one hand and at the unlocking knob 79 on the other hand and thus produces a restoring force which slides the locking pin 74 into the catch recess 73. As can be seen from FIG. 15, the two unlocking knobs 79 for the two locking pins 74 are aligned transversely with respect to the drill spindle 18 and lie so as to be flush with one another at opposite sides of the housing part 101 in such a way that they can be gripped between the thumb and finger of one hand and moved toward one another. This movement unlocks the catch lock 31" and the front housing part 101 can be moved into a desired swivel position. When this swivel position is achieved the two unlocking knobs 79 are released and the locking pins 74 are automatically slid into the diametrically opposite catch recesses 73 by the pressure springs 80. The front housing part 101 with drill spindle 18 is again fixed with respect to rotation in the selected new work position. The construction of the catch lock 31– with two unlocking knobs 79 which are to be actuated simultaneously has the advantage that an unintentional unlocking of the catch lock 31" while working with the drill is also not possible when an unlocking knob 79 is pressed in by mistake.

FIG. 14 also shows an adjustable depth stop 81 which is held at the rear housing part 102. The desired drilling depth can be set with the depth stop 81.

It will be understood that each of the elements described above, or two or more together, may also find a useful application in other types of constructions differing from the types described above.

While the invention has been illustrated and described as embodied in an electric hand tool, in particular a drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric hand tool, comprising a housing having a housing axis, an electric motor received in said housing and having a motor shaft parallel to said housing axis; a work spindle driven by said electric motor and having spindle end projecting out of said housing; a transmission gearing located between said electric motor and said work spindle so that said work spindle is driven by said electric motor via said transmission gearing; a bearing provided for said work spindle, said housing being divided along a dividing line into a front housing part which contains said bearing for said work spindle and a rear housing part which contains said electric motor and are rotatable relative to one another so that said work spindle extending in said front housing part can occupy a plurality of angles relative to said motor shaft and said housing axis; a manually operating catch lock for stopping said housing parts in a selected angular position relative to one another, said transmission being formed so that a torsionally rigid transmission of force from said motor shaft of said electric motor to said work spindle is provided in said transmission gearing in every angular position of said housing parts relative to one another; an intermediate flange arranged in the region of said dividing plane between said two housing parts and rotatably supported at said front housing part and connected with said rear housing part, said dividing plane being located so that a rotational axis of said intermediate flange encloses an angle of 90° relative to an axis of said motor shaft; a clamping plate which is fastened at said front housing part; and two axial bearings arranged one after the other in the axial direction of said intermediate flange and clamping said intermediate flange therebetween, one of said axial bearings being supported in said front housing part while another of said axial bearings is supported at said clamping plate, said intermediate flange being screwed to said rear housing part.

2. An electric tool as defined in claim 1, wherein said work spindle is rotatably supported in said housing and carries a tool receptacle at said end projecting out of said housing.

3. An electric tool as defined in claim 1; and further comprising means for sealing said intermediate flange relative to said front housing part.

4. An electric tool as defined in claim 3 wherein said sealing means includes a sealing ring arranged in said intermediate flange.

5. An electric tool as defined in claim 3, wherein said intermediate flange tightly contacts said rear housing part.

6. An electric tool as defined in claim 1, wherein said front housing part with said work spindle is swivelable relative to said rear housing part by 22.5° and is lockable in angular increments of 22.5°.

7. An electric hand tool, comprising a housing having a housing axis, an electric motor received in said housing and having a motor shaft parallel to said housing axis; a work spindle driven by said electric motor and having spindle end projecting out of said housing; a transmission gearing located between said electric motor and said work spindle so that said work spindle is driven by said electric motor via said transmission gearing; a bearing provided for said work spindle, said housing being divided along a dividing line into a front housing part which contains said bearing for said work spindle and a rear housing part which contains said electric motor and are rotatable relative to one another so that said work spindle extending in said front housing part can occupy a plurality of angles relative to said motor shaft and said housing axis; a manually operating catch lock for stopping said housing parts in a selected angular position relative to one another, said transmission being formed so that a torsionally rigid transmission of force from said motor shaft of said electric motor to said work spindle is provided in said transmission gearing in every angular position of said housing parts relative to one another; an intermediate flange arranged in the region of said dividing plane between said two housing parts and rotatably supported at said front housing part and connected with said rear housing part, said dividing plane being located so that a rotational axis of said intermediate flange encloses an angle of 90° relative to an axis of said motor shaft, said catch lock having a ring of catch recesses arranged at equidistant intervals and is held at said intermediate flange so as to be fixed with respect to rotation, and two locking pins supported so as to be radially displaceable in said front housing part, engage in diametrically opposite ones of said catch recesses, and are displaceable against a spring force, two unlocking knobs via which said two locking pins are displaceable at opposite sides of said front housing part and which are aligned with one another transversely to said work spindle for lifting out of said catch recesses, said unlocking knobs being arranged at said front housing part so that they can be gripped between a thumb and finger of one hand for a displacing movement in opposite directions.

* * * * *